(12) United States Patent
Zhao et al.

(10) Patent No.: US 11,736,685 B2
(45) Date of Patent: *Aug. 22, 2023

(54) REFERENCE SAMPLE PADDING AND FILTERING FOR INTRA PREDICTION IN VIDEO COMPRESSION

(71) Applicant: TENCENT AMERICA LLC, Palo Alto, CA (US)

(72) Inventors: Liang Zhao, Sunnyvale, CA (US); Xin Zhao, San Diego, CA (US); Xiang Li, Los Gatos, CA (US); Shan Liu, San Jose, CA (US)

(73) Assignee: TENCENT AMERICA LLC, Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/404,376

(22) Filed: Aug. 17, 2021

(65) Prior Publication Data

US 2021/0377522 A1 Dec. 2, 2021

Related U.S. Application Data

(63) Continuation of application No. 16/795,773, filed on Feb. 20, 2020, now Pat. No. 11,128,863, which is a (Continued)

(51) Int. Cl.
*H04N 19/11* (2014.01)
*H04N 19/44* (2014.01)
(Continued)

(52) U.S. Cl.
CPC ........... *H04N 19/11* (2014.11); *H04N 19/159* (2014.11); *H04N 19/44* (2014.11); *H04N 19/176* (2014.11)

(58) Field of Classification Search
CPC ...... H04N 19/11; H04N 19/159; H04N 19/44; H04N 19/176
See application file for complete search history.

(56) References Cited

U.S. PATENT DOCUMENTS 9,344,715 B2 * 5/2016 Liu .................... H04N 19/136
2005/0013365 A1 * 1/2005 Mukerjee ............ H04N 19/587
375/E7.254
(Continued)

FOREIGN PATENT DOCUMENTS

CN 107743705 A 2/2018
KR 10-2459185 B 10/2022
(Continued)

OTHER PUBLICATIONS

Office Action dated Feb. 24, 2022 in Korean Application No. 10-2020-7027950.
(Continued)

*Primary Examiner* — Zaihan Jiang
(74) *Attorney, Agent, or Firm* — Sughrue Mion, PLLC

(57) ABSTRACT

A method of and an apparatus for controlling intra prediction for decoding of a video sequence are provided. The method includes setting a table including a plurality of intra prediction modes respectively corresponding to a plurality of intra prediction angles, the plurality of intra prediction angles including diagonal intra prediction angles respectively corresponding to diagonal directions of all shapes of coding units, and selecting, for decoding the video sequence, one of the plurality of intra prediction modes, from the set table.

14 Claims, 11 Drawing Sheets

800

810 — Setting table including plurality of intra prediction modes respectively corresponding to plurality of intra prediction angles, plurality of intra prediction angles including diagonal intra prediction angles respectively corresponding to diagonal directions of all shapes of coding units 820 — Selecting, for decoding video sequence, one of plurality of intra prediction modes, from set table

Related U.S. Application Data continuation of application No. 16/202,876, filed on Nov. 28, 2018, now Pat. No. 10,630,979.

(60) Provisional application No. 62/698,526, filed on Jul. 16, 2018.

(51) Int. Cl.
*H04N 19/159* (2014.01)
*H04N 19/176* (2014.01)

(56) References Cited

U.S. PATENT DOCUMENTS

| | | | |
|---|---|---|---|
| 2012/0057630 A1* | 3/2012 | Saxena | H04N 19/105 |
| | | | 375/240.03 |
| 2012/0082224 A1* | 4/2012 | Van Der Auwera | |
| | | | H04N 19/593 |
| | | | 375/E7.243 |
| 2013/0114696 A1* | 5/2013 | Liu | H04N 19/103 |
| | | | 375/240.03 |
| 2013/0128966 A1* | 5/2013 | Gao | H04N 19/176 |
| | | | 375/240.12 |
| 2015/0003523 A1* | 1/2015 | Valin | H04N 19/13 |
| | | | 375/240.12 |
| 2015/0063438 A1* | 3/2015 | Kim | H04N 19/18 |
| | | | 375/240.02 |
| 2016/0373742 A1 | 12/2016 | Zhao et al. | |
| 2017/0134748 A1* | 5/2017 | Lee | H04N 19/182 |
| 2017/0347102 A1* | 11/2017 | Panusopone | H04N 19/105 |
| 2017/0366818 A1* | 12/2017 | Zhang | H04N 19/159 |
| 2018/0241995 A1* | 8/2018 | Son | H04N 19/11 |
| 2018/0367793 A1* | 12/2018 | Park | H04N 19/11 |

FOREIGN PATENT DOCUMENTS

| | | |
|---|---|---|
| WO | 2013105622 A1 | 7/2013 |
| WO | 2018/117892 A1 | 6/2018 |

OTHER PUBLICATIONS

ITU-T H-Series Recommendations, "Series H: Audiovisual and Multimedia Systems Infrastructure of audiovisual services—Coding of moving video: High efficiency video coding", H.265, 2013 (317 pages total).
Bross et al., "Versatile Video Coding (Draft 4)", Joint Video Experts Team (JVET) of ITU-T SG 16 WP 3 and ISO/IEC JTC 1/SC 29/WG 11, Document: JVET-M1001-v7, 13th Meeting: Marrakech, MA, Jan. 9-18, 2019 (300 pages total).
Fabian Racape et al., "CE3-related: Wide-angle intra prediction for non-square blocks", Joint Video Experts Team (JVET), of ITU-T SG 16 WP 3 and ISO/IEC JTC 1/SC 29/WG 11, JVET-K0500_r2, 11th Meeting, Ljubljana, SI, Jul. 10-18, 2018, pp. 1-7 (7 pages total).
Extended European Search Report dated Mar. 21, 2022 in European Application No. 19838093.3.
Gagan Rath et al., "CE3-related: Block Shape Adaptive Intra Prediction Directions", Joint Video Experts Team (JVET) of ITU-T SG 16 WP 3 and ISO/IEC JTC 1/SC 29/WG 11, JVET-K0169_r1, 11th Meeting Ljubljana, SI, Jul. 10-18, 2018, 6 pages.
Communication dated Sep. 13, 2021 by the Japanese Patent Office in application No. 2020-543619.
Liang Zhao et al., "CE3-RELATED: Wide-angle intra prediction for non-square blocks", Joint Video Experts Team (JVET) of ITU-T Sg 16 WP 3 and ISO/IEC JTC 1/SC 29/WG 11, 11th Meeting: Ljubljana, SI, Jul. 10-18, 2018, JVET-K0500_r3, 12 pages.
Korean Office Action dated May 23, 2023 in Korean Application No. 10-2022-7036067.

* cited by examiner

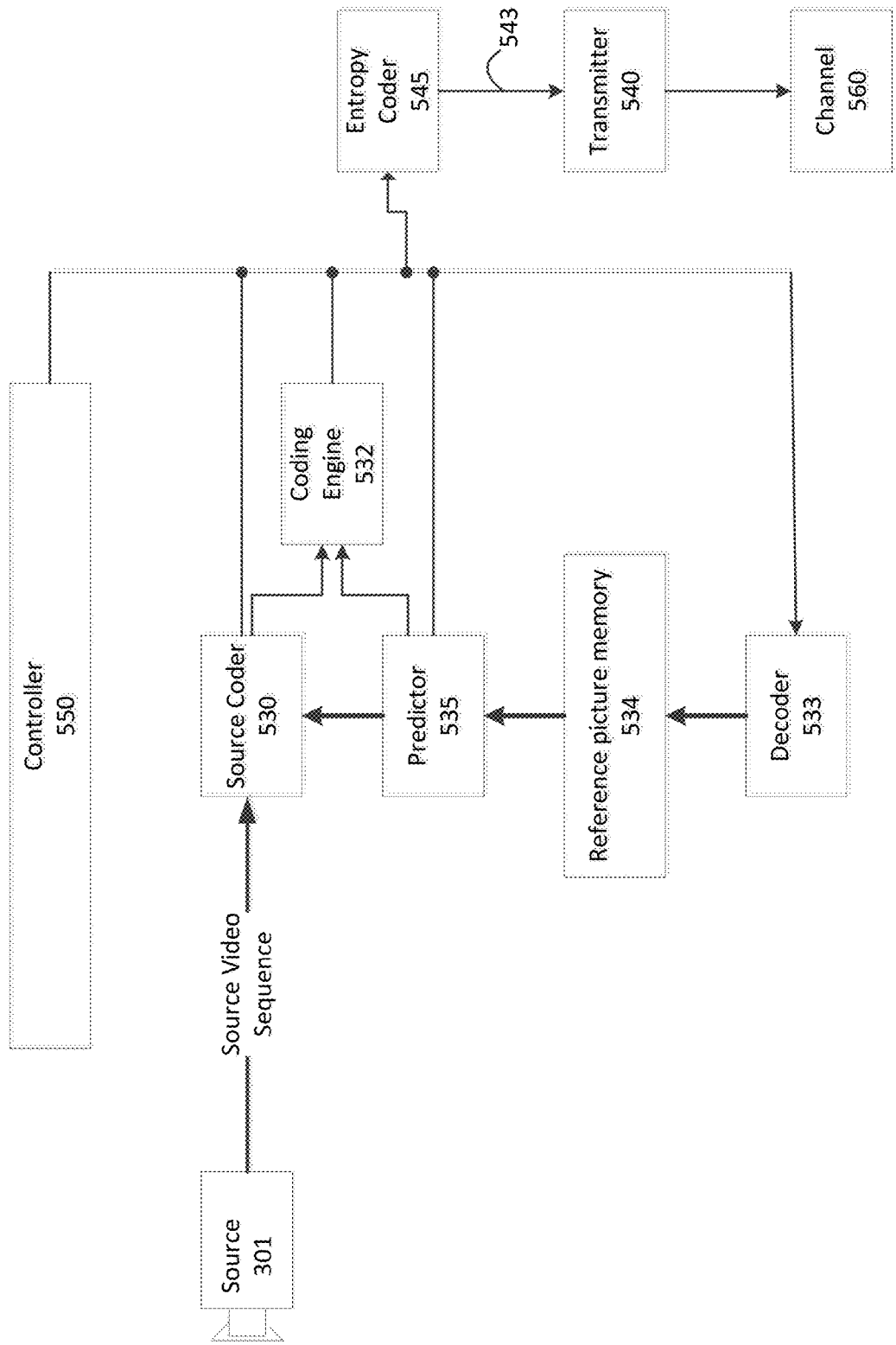
FIG. 5    Encoder 303

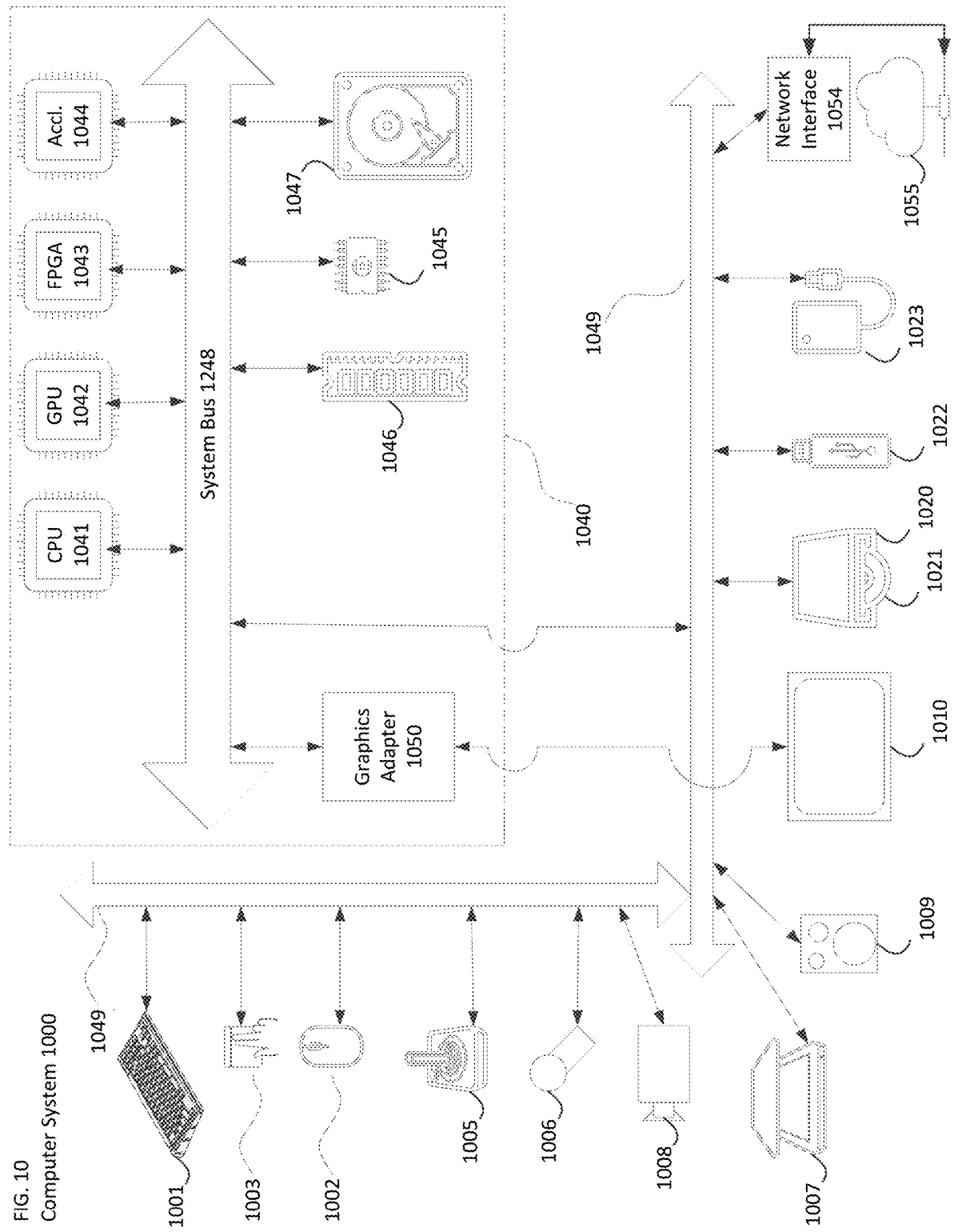

REFERENCE SAMPLE PADDING AND FILTERING FOR INTRA PREDICTION IN VIDEO COMPRESSION

CROSS-REFERENCE TO RELATED APPLICATION(S)

This application is a continuation application of U.S. patent application Ser. No. 16/795,773, filed Feb. 20, 2020 in the U.S. Patent and Trademark Office, which is a continuation application of U.S. patent application Ser. No. 16/202,876, filed Nov. 28, 2018 in the U.S. Patent and Trademark Office, now issued as U.S. Pat. No. 10,630,979 on Apr. 21, 2020, which claims priority from U.S. Provisional Patent Application No. 62/698,526, filed on Jul. 16, 2018, in the United States Patent and Trademark Office, both of which are incorporated herein by reference in their entirety.

BACKGROUND

1. Field

Methods and apparatuses consistent with embodiments relate to video processing, and more particularly, reference sample padding and filtering for intra prediction in video compression.

2. Description of Related Art

Intra prediction modes used in High Efficiency Video Coding (HEVC) are illustrated in FIG. 1. In HEVC, mode 10 (101) is a horizontal mode, mode 26 (102) is a vertical mode, and mode 2 (103), mode 18 (104) and mode 34 (105) are diagonal modes. Mode 2 (103) and 34 (105) indicate the same prediction direction.

Further in HEVC, wide angles beyond a range of prediction directions covered by conventional intra prediction modes are called wide angular intra prediction modes. These wide angles are only applied for non-square blocks as follows:

Angles going beyond 45 degree in a top-right direction (intra prediction mode 34 in HEVC) if a block width is larger than a block height; and Angles going beyond 45 degree in a bottom-left direction (intra prediction mode 2 in HEVC) if a block height is larger than a block width.

Further in HEVC, an intra sample substitution process of an intra mode is described in section 8.4.4.2 reproduced below, which includes a reference sample substitution process, a filtering process of a neighboring process, and an intra prediction process.

8.4.4.2.2 Reference Sample Substitution Process for Intra Sample Prediction

Inputs to this process are:
  reference samples $p[x][y]$ with $x=-1, y=-1 \ldots nTbS*2-1$ and $x=0 \ldots nTbS*2-1, y=-1$ for intra sample prediction,
  a transform block size nTbS,
  a variable cIdx specifying the colour component of the current block.

Outputs of this process are the modified reference samples $p[x][y]$ with $x=-1, y=-1 \ldots nTbS*2-1$ and $x=0 \ldots nTbS*2-1, y=-1$ for intra sample prediction.

The variable bitDepth is derived as follows:
  If cIdx is equal to 0, bitDepth is set equal to $BitDepth_Y$.
  Otherwise, bitDepth is set equal to $BitDepth_C$.

The values of the samples $p[x][y]$ with $x=-1, y=-1 \ldots nTbS*2-1$ and $x=0 \ldots nTbS*2-1, y=-1$ are modified as follows:

If all samples $p[x][y]$ with $x=-1, y=-1 \ldots nTbS*2-1$ and $x=0 \ldots nTbS*2-1, y=-1$ are marked as "not available for intra prediction", the value 1«(bitDepth-1) is substituted for the values of all samples $p[x][y]$.

Otherwise (at least one but not all samples $p[x][y]$ are marked as "not available for intra prediction"), the following ordered steps are performed:

1. When $p[-1][nTbS*2-1]$ is marked as "not available for intra prediction", search sequentially starting from $x=-1, y=nTbS*2-1$ to $x=-1, y=-1$, then from $x=0, y=-1$ to $x=nTbS*2-1, y=-1$. Once a sample $p[x][y]$ marked as "available for intra prediction" is found, the search is terminated and the value of $p[x][y]$ is assigned to $p[-1][nTbS*2-1]$.

2. Search sequentially starting from $x=-1, y=nTbS*2-2$ to $x=-1, y=-1$, when $p[x][y]$ is marked as "not available for intra prediction", the value of $p[x][y+1]$ is substituted for the value of $p[x][y]$.

3. For $x=0 \ldots nTbS*2-1, y=-1$, when $p[x][y]$ is marked as "not available for intra prediction", the value of $p[x-1][y]$ is substituted for the value of $p[x][y]$.

All samples $p[x][y]$ with $x=-1, y=-1 \ldots nTbS*2-1$ and $x=0 \ldots nTbS*2-1, y=-1$ are marked as "available for intra prediction".

8.4.4.2.3 Filtering Process of Neighbouring Samples

Inputs to this process are:
  the neighbouring samples $p[x][y]$, with $x=-1, y=-1 \ldots nTbS*2-1$ and $x=0 \ldots nTbS*2-1, y=-1$,
  a variable nTbS specifying the transform block size.

Outputs of this process are the filtered samples $pF[x][y]$, with $x=-1, y=-1 \ldots nTbS*2-1$ and $x=0 \ldots nTbS*2-1, y=-1$.

The variable filterFlag is derived as follows:
  If one or more of the following conditions are true, filterFlag is set equal to 0:
  predModeIntra is equal to INTRA_DC.
  nTbS is equal 4.

Otherwise, the following applies:
  The variable minDistVerHor is set equal to Min(Abs (predModeIntra-26), Abs(predModeIntra-10)).
  The variable intraHorVerDistThres[nTbS] is specified in Table 8-3.
  The variable filterFlag is derived as follows:
    If minDistVerHor is greater than intraHorVerDistThres [nTbS], filterFlag is set equal to 1.
    Otherwise, filterFlag is set equal to 0.

TABLE 8-3

Specification of intraHorVerDistThres [nTbS] for various transform block sizes

| | nTbS = 8 | nTbS = 16 | nTbS = 32 |
|---|---|---|---|
| intraHorVerDistThres[nTbS] | 7 | 1 | 0 |

When filterFlag is equal to 1, the following applies:
 The variable biIntFlag is derived as follows:
  If all of the following conditions are true, biIntFlag is set equal to 1:
   strong_intra_smoothing_enabled_flag is equal to 1
   nTbS is equal to 32

$\text{Abs}(p[-1][-1]+p[nTbS*2-1][-1]-2*p[nTbS-1][-1]) <$
   $(1 << (\text{BitDepth}_Y - 5))$ $\text{Abs}(p[-1][-1]+p[-1][nTbS*2-1]-2*p[-1][nTbS-1]) <$
   $(1 << (\text{BitDepth}_Y - 5))$ Otherwise, biIntFlag is set equal to 0.
 The filtering is performed as follows:
  If biIntFlag is equal to 1, the filtered sample values pF[x][y] with x=−1, y=−1 . . . 63 and x=0 . . . 63, y=−1 are derived as follows:

$pF[-1][-1] = p[-1][-1]$ (8-30)

$pF[-1][y] = ((63-y)*p[-1][-1]+(y+1)*p[-1][63]+32) >> 6$ for $y=0 \ldots 62$ (8-31)

$pF[-1][63] = p[-1][63]$ (8-32)

$pF[x][-1] = ((63-x)*p[-1][-1]+(x+1)*p[63][-1]+32) >> 6$ for $x=0 \ldots 62$ (8-33)

$pF[63][-1] = p[63][-1]$ (8-34)

Otherwise (biIntFlag is equal to 0), the filtered sample values pF[x][y] with x=−1, y=−1 . . . nTbS*2−1 and x=0 . . . nTbS*2−1, y=−1 are derived as follows:

$pF[-1][-1] = (p[-1][0]+2*p[-1][-1]+p[0][-1]+2) >> 2$ (8-35)

$pF[-1][y] = (p[-1][y+1]+2*p[-1][y]+p[-1][y-1]+2) >> 2$ for $y=0 \ldots nTbS*2-2$ (8-36)

$pF[-1][nTbS*2-1] = p[-1][nTbS*2-1]$ (8-37)

$pF[x][-1] = (p[x-1][-1]+2*p[x][-1]+p[x+1][-1]+2) >> 2$ for $x=0 \ldots nTbS*2-2$ (8-38)

$pF[nTbS*2-1][-1] = p[nTbS*2-1][-1]$ (8-39)

8.4.4.2.6 Specification of Intra Prediction Mode in the Range of INTRA_ANGULAR2 . . . INTRA_ANGULAR34
Inputs to this process are:
 the intra prediction mode predModeIntra,
 the neighbouring samples p[x][y], with x=−1, y=−1 . . . nTbS*2−1 and x=0 . . . nTbS*2−1, y=−1,
 a variable nTbS specifying the transform block size,
 a variable cIdx specifying the colour component of the current block.
Outputs of this process are the predicted samples predSamples[x][y], with x, y=0 . . . nTbS−1.
FIG. 6B illustrates the total 33 intra angles and Table 8-4 specifies the mapping table between predModeIntra and the angle parameter intraPredAngle.

Table 8-5 further specifies the mapping table between predModeIntra and the inverse angle parameter invAngle.

TABLE 8-5

Specification of invAngle

| predModeIntra | 11 | 12 | 13 | 14 | 15 | 16 | 17 | 18 |
|---|---|---|---|---|---|---|---|---|
| invAngle | −4096 | −1638 | −910 | −630 | −482 | −390 | −315 | −256 |
| predModeIntra | 19 | 20 | 21 | 22 | 23 | 24 | 25 | 26 |
| invAngle | −315 | −390 | −482 | −630 | −910 | −1638 | −4096 | — |

The values of the prediction samples predSamples[x][y], with x, y=0 . . . nTbS−1 are derived as follows:
 If predModeIntra is equal or greater than 18, the following ordered steps apply:
  1. The reference sample array ref[x] is specified as follows:
   The following applies:

$\text{ref}[x] = p[-1+x][-1]$, with $x=0 \ldots nTbS$ (8-47)

If intraPredAngle is less than 0, the main reference sample array is extended as follows:
   When $(nTbS*\text{intraPredAngle}) >> 5$ is less than −1, $\text{ref}[x] = p[-1][-1+((x*\text{invAngle}+128) >> 8)]$, with $x=-1 \ldots (nTbS*\text{intraPredAngle}) >> 5$ (8-48)

Otherwise, $\text{ref}[x] = p[-1+x][-1]$, with $x=nTbS+1 \ldots 2*nTbS$ (8-49)

2. The values of the prediction samples predSamples[x][y], with x, y=0 . . . nTbS−1 are derived as follows:
   a. The index variable iIdx and the multiplication factor iFact are derived as follows:

$iIdx = ((y+1)*\text{intraPredAngle}) >> 5$ (8-50)

$iFact = ((y+1)*\text{intraPredAngle}) \, \& \, 31$ (8-51)

b. Depending on the value of iFact, the following applies:
    If iFact is not equal to 0, the value of the prediction samples predSamples[x][y] is derived as follows:

$\text{predSamples}[x][y] = ((32-iFact)*\text{ref}[x+iIdx+1]+iFact*\text{ref}[x+iIdx+2]+16) >> 5$ (8-52)

Otherwise, the value of the prediction samples predSamples[x][y] is derived as follows:

$\text{predSamples}[x][y] = \text{ref}[x+iIdx+1]$ (8-53)

c. When predModeIntra is equal to 26 (vertical), cIdx is equal to 0 and nTbS is less than 32, the following filtering applies with x=0, y=0 . . . nTbS−1:

$\text{predSamples}[x][y] = \text{Clip1}_Y(p[x][-1]+((p[-1][y]-p[-1][-1]) >> 1))$ (8-54)

TABLE 8-4

Specification of intraPredAngle

| predModeIntra | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| intraPredAngle | — | 32 | 26 | 21 | 17 | 13 | 9 | 5 | 2 | 0 | −2 | −5 | −9 | −13 | −17 | −21 | −26 |
| predModeIntra | 18 | 19 | 20 | 21 | 22 | 23 | 24 | 25 | 26 | 27 | 28 | 29 | 30 | 31 | 32 | 33 | 34 |
| intraPredAngle | −32 | −26 | −21 | −17 | −13 | −9 | −5 | −2 | 0 | 2 | 5 | 9 | 13 | 17 | 21 | 26 | 32 |

Otherwise (predModeIntra is less than 18), the following ordered steps apply:
1. The reference sample array ref[ x] is specified as follows:
   The following applies:

$$\text{ref}[x] = p[-1][-1+x], \text{ with } x=0 \ldots nTbS \quad (8\text{-}55)$$

If intraPredAngle is less than 0, the main reference sample array is extended as follows:
   When (nTbS*intraPredAngle)>>5 is less than −1, $$\text{ref}[x] = p[-1+((x*\text{invAngle}+128)>>8)][-1], \text{ with } x=-1 \ldots (nTbS*\text{intraPredAngle})>>5 \quad (8\text{-}56)$$

Otherwise, $$\text{ref}[x] = p[-1][-1+x], \text{ with } x=nTbS+1 \ldots 2*nTbS \quad (8\text{-}57)$$

2. The values of the prediction samples predSamples[x][y], with x, y=0 . . . nTbS−1 are derived as follows:
   a. The index variable iIdx and the multiplication factor iFact are derived as follows:

$$iIdx = ((x+1)*\text{intraPredAngle})>>5 \quad (8\text{-}58)$$

$$iFact = ((x+1)*\text{intraPredAngle}) \& 31 \quad (8\text{-}59)$$

b. Depending on the value of iFact, the following applies:
   If iFact is not equal to 0, the value of the prediction samples predSamples[x][y] is derived as follows:

$$\text{predSamples}[x][y] = ((32-iFact)*\text{ref}[y+iIdx+1] + iFact*\text{ref}[y+iIdx+2]+16)>>5 \quad (8\text{-}60)$$

Otherwise, the value of the prediction samples predSamples[x][y] is derived as follows:

$$\text{predSamples}[x][y] = \text{ref}[y+iIdx+1] \quad (8\text{-}61)$$

c. When predModeIntra is equal to 10 (horizontal), cIdx is equal to 0 and nTbS is less than 32, the following filtering applies with x=0 . . . nTbS−1, y=0:

$$\text{predSamples}[x][y] = \text{Clip1}_Y(p[-1][y]+((p[x][-1]-p[-1][-1])>>1)) \quad (8\text{-}62)$$

SUMMARY

According to embodiments, a method of controlling intra prediction for decoding of a video sequence is performed by at least one processor and includes setting a table including a plurality of intra prediction modes respectively corresponding to a plurality of intra prediction angles. The plurality of intra prediction angles includes diagonal intra prediction angles respectively corresponding to diagonal directions of all shapes of coding units. The method further includes selecting, for decoding the video sequence, one of the plurality of intra prediction modes, from the set table.

According to embodiments, an apparatus for controlling intra prediction for decoding of a video sequence includes at least one memory configured to store computer program code, and at least one processor configured to access the at least one memory and operate according to the computer program code. The computer program code includes setting code configured to cause the at least one processor to set a table including a plurality of intra prediction modes respectively corresponding to a plurality of intra prediction angles. The plurality of intra prediction angles includes diagonal intra prediction angles respectively corresponding to diagonal directions of all shapes of coding units. The computer program code further includes selecting code configured to cause the at least one processor to select, for decoding the video sequence, one of the plurality of intra prediction modes, from the set table.

According to embodiments, a non-transitory computer-readable storage medium storing instructions that cause a processor to set a table including a plurality of intra prediction modes respectively corresponding to a plurality of intra prediction angles. The plurality of intra prediction angles includes diagonal intra prediction angles respectively corresponding to diagonal directions of all shapes of coding units. The instructions further cause the processor to select, for decoding a video sequence, one of the plurality of intra prediction modes, from the set table.

BRIEF DESCRIPTION OF THE DRAWINGS

FIG. 5 is a functional block diagram of a video encoder according to an embodiment.

FIG. 10 is a diagram of a computer system suitable for implementing embodiments.

DETAILED DESCRIPTION

Figure 1:
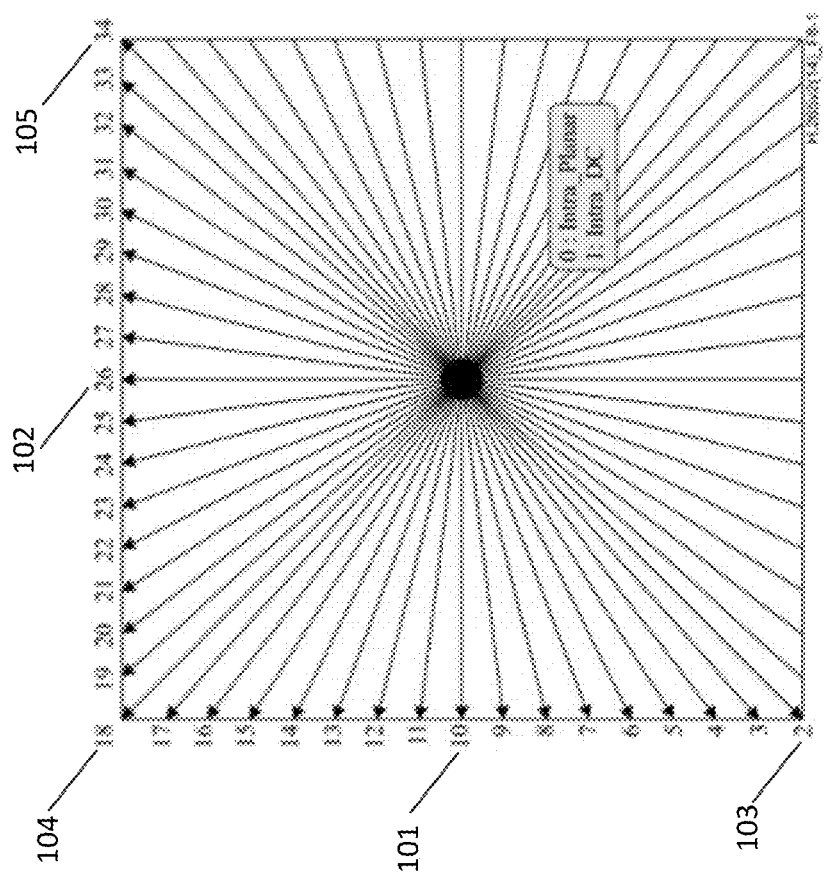
FIG. 1 is a diagram of intra prediction modes in HEVC.
Figure 2:
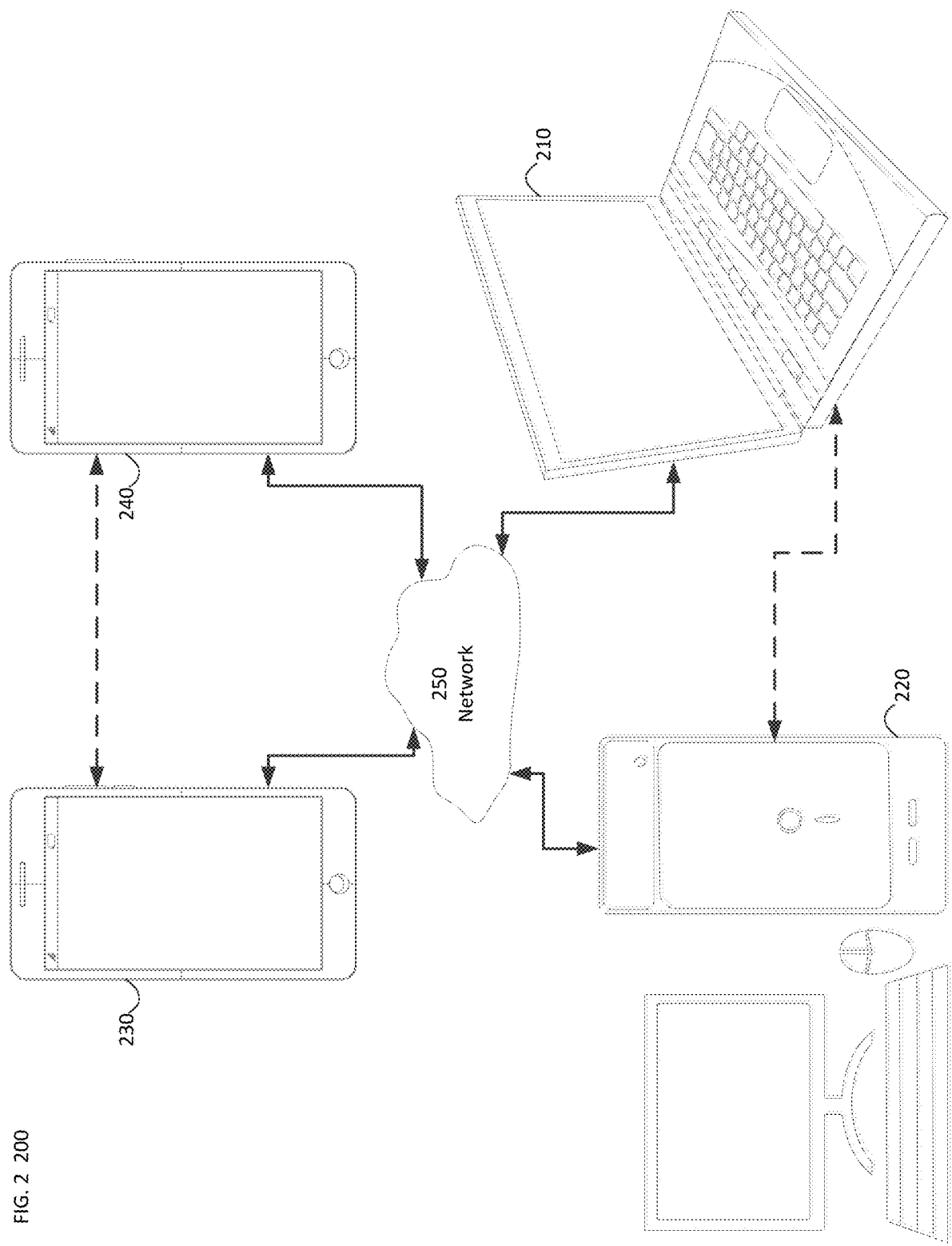
FIG. 2 is a simplified block diagram of a communication system according to an embodiment.

FIG. 2 is a simplified block diagram of a communication system (200) according to an embodiment. The communication system (200) may include at least two terminals (210-220) interconnected via a network (250). For unidirectional transmission of data, a first terminal (210) may code video data at a local location for transmission to the other terminal (220) via the network (250). The second terminal (220) may receive the coded video data of the other terminal from the network (250), decode the coded data and display the recovered video data. Unidirectional data transmission may be common in media serving applications and the like.

FIG. 2 illustrates a second pair of terminals (230, 240) provided to support bidirectional transmission of coded video that may occur, for example, during videoconferencing. For bidirectional transmission of data, each terminal (230, 240) may code video data captured at a local location for transmission to the other terminal via the network (250). Each terminal (230, 240) also may receive the coded video data transmitted by the other terminal, may decode the coded data and may display the recovered video data at a local display device.

In FIG. 2, the terminals (210-240) may be illustrated as servers, personal computers and smart phones but the principles of embodiments are not so limited. Embodiments find application with laptop computers, tablet computers, media players and/or dedicated video conferencing equipment. The network (250) represents any number of networks that convey coded video data among the terminals (210-240), including for example wireline and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of embodiments unless explained herein below.

Figure 3:
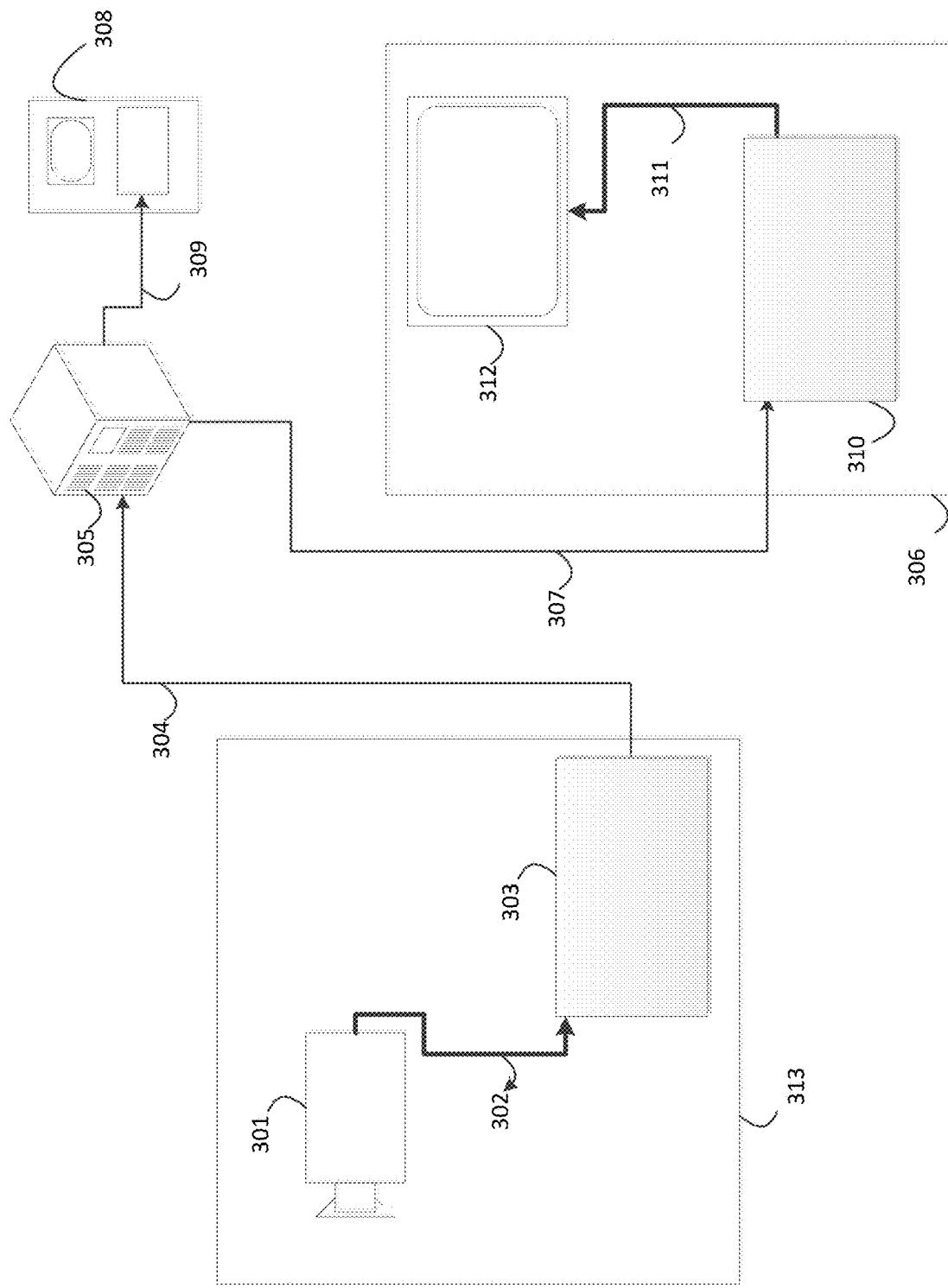
FIG. 3 is a diagram of a placement of a video encoder and a video decoder in a streaming environment, according to an embodiment.

FIG. 3 is a diagram of a placement of a video encoder and a video decoder in a streaming environment, according to an embodiment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313) that can include a video source (301), for example a digital camera, creating, for example, an uncompressed video sample stream (302). That sample stream (302), depicted as a bold line to emphasize a high data volume when compared to encoded video bitstreams, can be processed by an encoder (303) coupled to the camera (301). The encoder (303) can include hardware, software, or a combination thereof to enable or implement aspects of the disclosed subject matter as described in more detail below. The encoded video bitstream (304), depicted as a thin line to emphasize the lower data volume when compared to the sample stream, can be stored on a streaming server (305) for future use. One or more streaming clients (306, 308) can access the streaming server (305) to retrieve copies (307, 309) of the encoded video bitstream (304). A client (306) can include a video decoder (310) which decodes the incoming copy of the encoded video bitstream (307) and creates an outgoing video sample stream (311) that can be rendered on a display (312) or other rendering device (not depicted). In some streaming systems, the video bitstreams (304, 307, 309) can be encoded according to certain video coding/compression standards. Examples of those standards include ITU-T Recommendation H.265. Under development is a video coding standard informally known as VVC. The disclosed subject matter may be used in the context of VVC.

Figure 4:
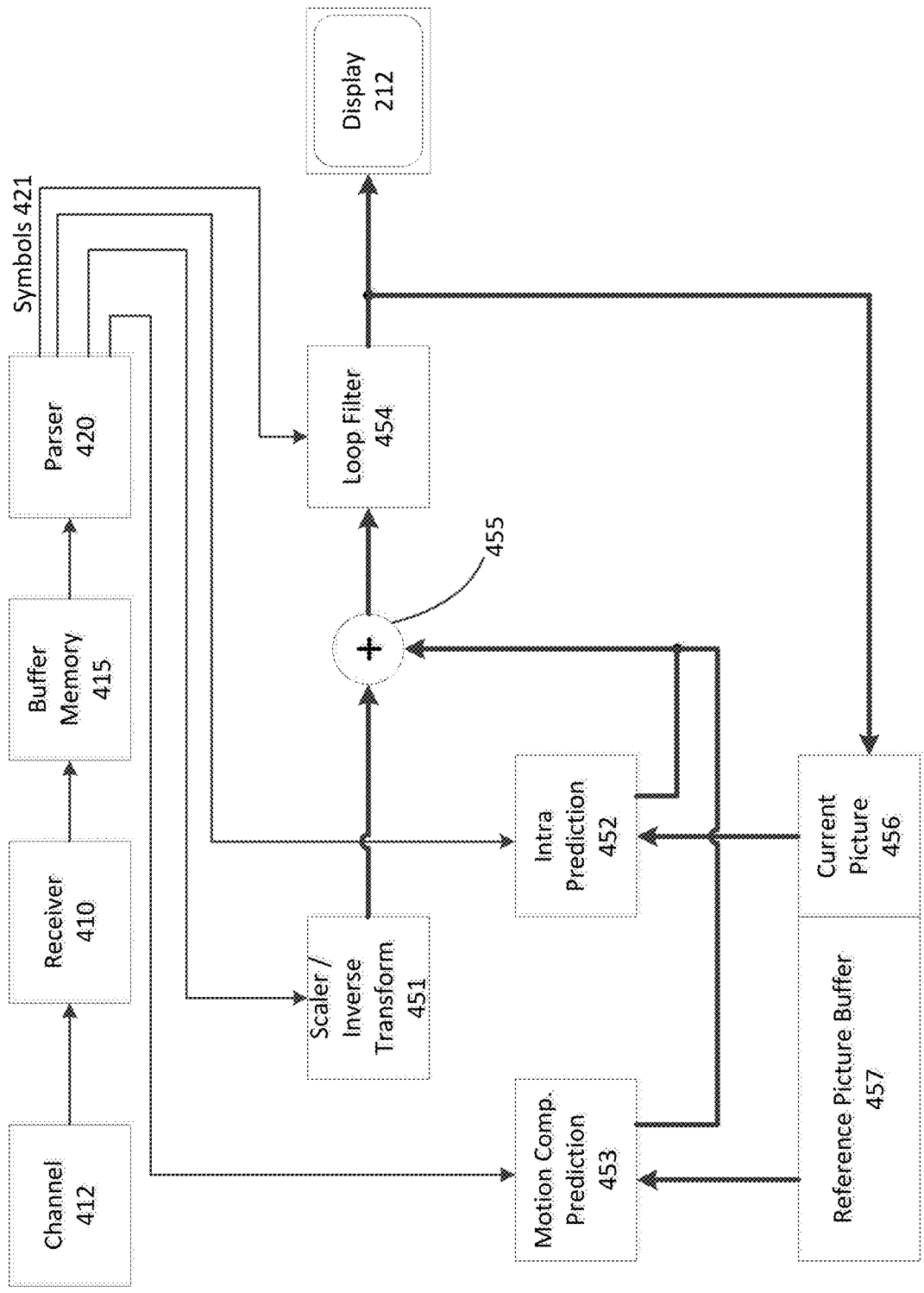
FIG. 4 is a functional block diagram of a video decoder according to an embodiment.

FIG. 4 is a functional block diagram of a video decoder (310) according to an embodiment.

A receiver (410) may receive one or more codec video sequences to be decoded by the decoder (310); in the same or an embodiment, one coded video sequence at a time, where the decoding of each coded video sequence is independent from other coded video sequences. The coded video sequence may be received from a channel (412), which may be a hardware/software link to a storage device which stores the encoded video data. The receiver (410) may receive the encoded video data with other data, for example, coded audio data and/or ancillary data streams, that may be forwarded to their respective using entities (not depicted). The receiver (410) may separate the coded video sequence from the other data. To combat network jitter, a buffer memory (415) may be coupled in between receiver (410) and entropy decoder/parser (420) ("parser" henceforth). When receiver (410) is receiving data from a store/forward device of sufficient bandwidth and controllability, or from an isosynchronous network, the buffer (415) may not be needed, or can be small. For use on best effort packet networks such as the Internet, the buffer (415) may be required, can be comparatively large and can advantageously of adaptive size.

The video decoder (310) may include a parser (420) to reconstruct symbols (421) from the entropy coded video sequence. Categories of those symbols include information used to manage operation of the decoder (310), and potentially information to control a rendering device such as a display (312) that is not an integral part of the decoder but can be coupled to it, as was shown in FIG. 4. The control information for the rendering device(s) may be in the form of Supplementary Enhancement Information (SEI messages) or Video Usability Information (VUI) parameter set fragments (not depicted). The parser (420) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter (QP) values, motion vectors, and so forth.

The parser (420) may perform entropy decoding/parsing operation on the video sequence received from the buffer (415), so to create symbols (421). The parser (420) may receive encoded data, and selectively decode particular symbols (421). Further, the parser (420) may determine whether the particular symbols (421) are to be provided to a Motion Compensation Prediction unit (453), a scaler/inverse transform unit (451), an Intra Prediction unit (452), or a loop filter unit (454).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives quantized transform coefficient as well as control information, including which transform to use, block size, quantization factor, quantization scaling matrices, etc. as symbol(s) (421) from the parser (420). It can output blocks comprising sample values that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current (partly reconstructed) picture (456). The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a Motion Compensation Prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (421) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (455) can be subject to various loop filtering techniques in the loop filter unit (454). Video compression technologies can include in-loop filter technologies that are controlled by parameters included in the coded video bitstream and made available to the loop filter unit (454) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (454) can be a sample stream that can be output to the render device (312) as well as stored in the reference picture memory (456) for use in future inter-picture prediction.

Certain coded pictures, once fully reconstructed, can be used as reference pictures for future prediction. Once a coded picture is fully reconstructed and the coded picture has been identified as a reference picture (by, for example, parser (420)), the current reference picture (456) can become part of the reference picture buffer (457), and a fresh current picture memory can be reallocated before commencing the reconstruction of the following coded picture.

The video decoder (310) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (410) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

FIG. 5 is a functional block diagram of a video encoder (303) according to an embodiment.

The encoder (303) may receive video samples from a video source (301) (that is not part of the encoder) that may capture video image(s) to be coded by the encoder (303).

The video source (301) may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder (303) may code and compress the pictures of the source video sequence into a coded video sequence (543) in real time or under any other time constraints as required by the application. Enforcing appropriate coding speed is one function of Controller (550). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (550) as they may pertain to video encoder (303) optimized for a certain system design.

Some video encoders operate in what a person skilled in the art readily recognizes as a "coding loop." As an oversimplified description, a coding loop can consist of the encoding part of an encoder (530) ("source coder" henceforth) (responsible for creating symbols based on an input picture to be coded, and a reference picture(s)), and a (local) decoder (533) embedded in the encoder (303) that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory (534). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (533) can be the same as of a "remote" decoder (310), which has already been described in detail above in conjunction with FIG. 4. Briefly referring also to FIG. 4, however, as symbols are available and en/decoding of symbols to a coded video sequence by entropy coder (545) and parser (420) can be lossless, the entropy decoding parts of decoder (310), including channel (412), receiver (410), buffer (415), and parser (420) may not be fully implemented in local decoder (533).

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder (530) may perform motion compensated predictive coding, which codes an input frame predictively with reference to one or more previously-coded frames from the video sequence that were designated as "reference frames." In this manner, the coding engine (532) codes differences between pixel blocks of an input frame and pixel blocks of reference frame(s) that may be selected as prediction reference(s) to the input frame.

The local video decoder (533) may decode coded video data of frames that may be designated as reference frames, based on symbols created by the source coder (530). Operations of the coding engine (532) may advantageously be lossy processes. When the coded video data may be decoded at a video decoder (not shown in FIG. 4), the reconstructed video sequence typically may be a replica of the source video sequence with some errors. The local video decoder (533) replicates decoding processes that may be performed by the video decoder on reference frames and may cause reconstructed reference frames to be stored in the reference picture cache (534). In this manner, the encoder (303) may store copies of reconstructed reference frames locally that have common content as the reconstructed reference frames that will be obtained by a far-end video decoder (absent transmission errors).

The predictor (535) may perform prediction searches for the coding engine (532). That is, for a new frame to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the video coder (530), including, for example, setting of parameters and subgroup parameters used for encoding the video data.

Output of all aforementioned functional units may be subjected to entropy coding in the entropy coder (545). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (540) may buffer the coded video sequence(s) as created by the entropy coder (545) to prepare it for transmission via a communication channel (560), which may be a hardware/software link to a storage device that may store the encoded video data. The transmitter (540) may merge coded video data from the video coder (530) with other data to be transmitted, for example, coded audio data and/or ancillary data streams (sources not shown).

The controller (550) may manage operation of the encoder (303). During coding, the controller (550) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (303) may perform coding operations according to a predetermined video coding technology or standard, such as ITU-T Rec. H.265. In its operation, the video coder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The video coder (530) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Figure 6A:
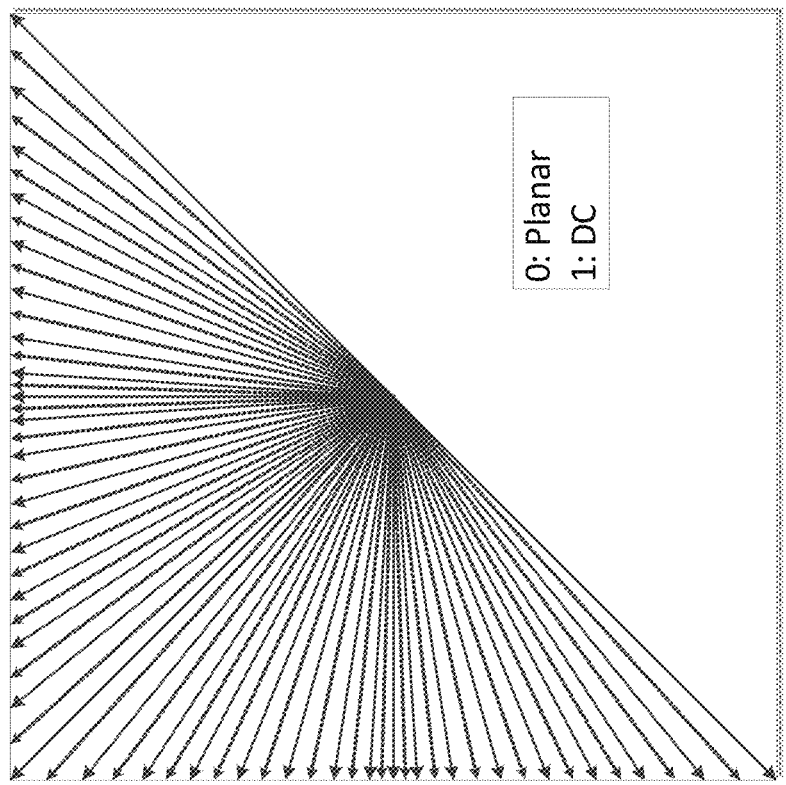
FIG. 6A is a diagram of intra prediction modes in Versatile Video Coding (VVC) Test Model (VTM 1).

FIG. 6A is a diagram of intra prediction modes in VTM 1.

Referring to FIG. 6A, an intra prediction scheme based on 65 directional modes has been proposed to capture arbitrary edge directions presented in natural video, and this intra prediction scheme based on 65 directional modes is being studied for the development of VVC. In VTM 1, mode 2 and 66 indicate the same prediction direction.

For non-square blocks, several conventional angular intra prediction modes may be replaced with wide angular modes. The replaced modes may be signaled using the original method and remapped to indices of the wide angular modes after parsing. A total number of intra prediction modes may be unchanged, i.e., 35 as in VTM 1, and intra mode coding may be unchanged.

In a case of 35 intra prediction modes, replaced intra prediction modes may be illustrated in below Table 4, in which W denotes a block width and H denotes a block height.

TABLE 4

Intra prediction modes replaced by wide-angular modes when 35 intra prediction modes are used.

| Condition | Replaced intra prediction modes |
|---|---|
| W/H == 2 | Modes 2, 3, 4 |
| W/H > 2 | Modes 2, 3, 4, 5, 6 |
| W/H == 1 | None |
| H/W == 1/2 | Modes 32, 33, 34 |
| H/W < 1/2 | Modes 30, 31, 32, 33, 34 |

In a case of 67 intra prediction modes, replaced intra prediction modes may be illustrated in below Table 5, in which W denotes a block width and H denotes a block height.

TABLE 5

Intra prediction modes replaced by wide-angular modes when 67 intra prediction modes are used.

| Condition | Replaced intra prediction modes |
|---|---|
| W/H == 2 | Modes 2, 3, 4, 5, 6, 7 |
| W/H > 2 | Modes 2, 3, 4, 5, 6, 7, 8, 9, 10, 11 |
| W/H == 1 | None |
| H/W == 1/2 | Modes 61, 62, 63, 64, 65, 66 |
| H/W < 1/2 | Mode 57, 58, 59, 60, 61, 62, 63, 64, 65, 66 |

Figure 6B:
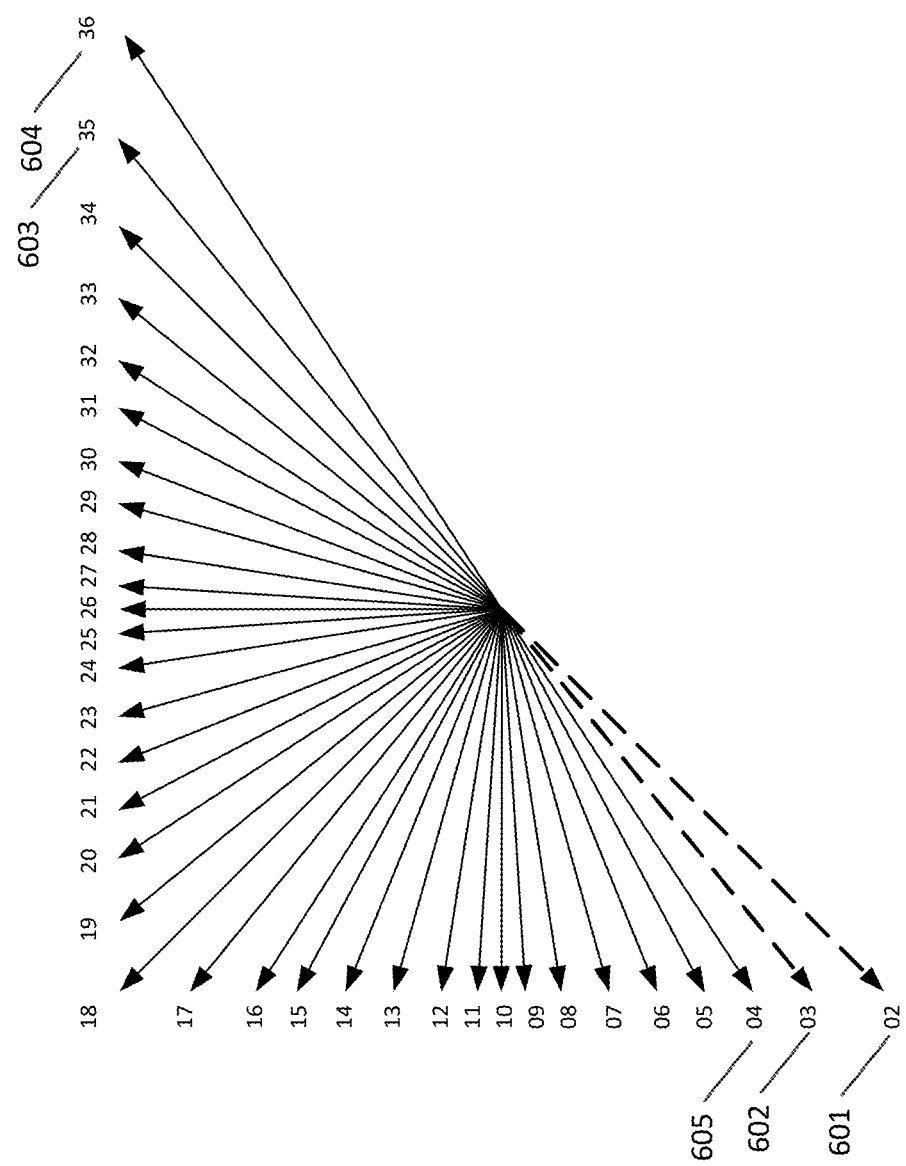
FIG. 6B is a diagram illustrating replacing intra prediction modes with wide angular intra prediction modes, for a non-square block.

FIG. 6B is a diagram illustrating replacing intra prediction modes with wide angular intra prediction modes, for a non-square block.

Referring to FIG. 6B, mode 2 (601) and mode 3 (602) are replaced with wide angle mode 35 (603) and mode 36 (604). A direction of mode 35 (603) is pointing to an opposite direction of mode 3 (602), and a direction of mode 36 (604) is pointing to an opposite direction of mode 4 (605).

However, in VTM 1, when wide-angle intra prediction directions are applied, neighboring reference samples in an above row or left column are not enough for non-square blocks.

Embodiments herein may be used separately or combined in any order. In this description, if a width is greater than or equal to a height, a top row is called a long side and a left column is called a short side. Otherwise, the top row is called the short side and the left column is called the long side. A block width is indicated by nWidth and a block height is indicated by nHeight.

When padding an array or buffer of N reference samples, it means reference sample values are either filled by neighboring reconstructed samples located at an associated position of the reference samples, or copied from reference samples that are already filled, or derived from reference samples that are already filled using a pre-defined function (e.g., linear extrapolation).

Embodiments may include padding a different number of reference samples, dependent on coded information including, but not limited to, a block size, a block width, a block height, a block width to height ratio, a block area size, and an intra prediction direction.

In an embodiment, it is proposed to pad 2*max (nWidth, nHeight)+1 samples both for above and left neighboring reference samples.

In another embodiment, it is proposed to pad 2*max (nWidth, nHeight)+1 samples for a long side, and nWidth+nHeight+1 samples for a short side.

In another embodiment, it is proposed to pad 2*nWidth+3 samples for the above reference samples, and 2*nHeight+3 samples for the left reference samples.

In another embodiment, it is proposed to pad 2*nWidth+3 samples for the above reference samples, and 2*nHeight+3 samples for the left reference samples, when width/height<=4 or height/width<=4. Otherwise, pad 2*max (nWidth, nHeight)+1 samples for the long side, and pad 2*min (nWidth, nHeight)+1+M for the short side. M can be 10, 11, 12, 13, or 14.

In another embodiment, it is proposed to pad 2*nWidth+M samples for the above reference samples, and 2*nHeight+N samples for the left reference samples. Values of M and N may depend on the coded information including, but not limited to, the block size, the block width, the block height, the block width to height ratio, the block area size, and the intra prediction direction.

Embodiments may include removing several conventional angles in a short side and adding a same number of wide angles in a long side. After removing the angles in the short side, remaining angles are all within a diagonal direction of each block shape, in which the diagonal direction is indicated by a line connecting top-right and bottom-left corners.

Figure 7A:
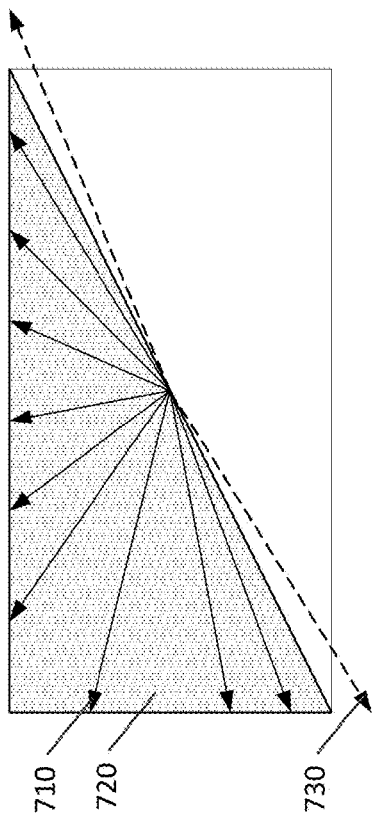
FIG. 7A is a diagram of prediction angles within and beyond a diagonal direction, according to an embodiment.

FIG. 7A is a diagram of prediction angles within and beyond a diagonal direction, according to an embodiment.

Referring to FIG. 7A, prediction angles (710) (solid arrows) located within a top-left textured triangle area (720) are intra prediction angles within a diagonal direction, and prediction angles (730) (dotted angles) located outside the top-left textured triangle area (720) are intra prediction angles beyond the diagonal direction.

In an embodiment, in a case of 35 intra modes, a number of removed modes is illustrated by Table 3, in which W denotes a block width and H denotes a block height.

TABLE 3

Intra prediction modes replaced by wide-angular modes when 35 intra prediction modes are used.

| Condition | Replaced intra prediction modes |
| --- | --- |
| W/H == 32 | Modes 2, 3, 4, 5, 6, 7, 8, 9 |
| W/H == 16 | Modes 2, 3, 4, 5, 6, 7, 8 |
| W/H == 8 | Modes 2, 3, 4, 5, 6, 7, 8 |
| W/H == 4 | Modes 2, 3, 4, 5, 6, 7 |
| W/H == 2 | Modes 2, 3, 4, 5 |
| W/H == 1 | None |
| H/W == 1/2 | Modes 31, 32, 33, 34 |
| H/W == 1/4 | Modes 29, 30, 31, 32, 33, 34 |
| H/W == 1/8 | Modes 28, 29, 30, 31, 32, 33, 34 |
| H/W == 1/16 | Modes 28, 29, 30, 31, 32, 33, 34 |
| H/W == 1/32 | Modes 27, 28, 29, 30, 31, 32, 33, 34 |

In an embodiment, in a case of 67 intra modes, a number of removed modes is illustrated by Table 4, in which W denotes a block width and H denotes a block height.

TABLE 4

Intra prediction modes replaced by wide-angular modes when 67 intra prediction modes are used.

| Condition | Replaced intra prediction modes |
| --- | --- |
| W/H == 32 | Modes 2, 3, 4, 5, 6, 7, 8, 9, 10, 11, 12, 13, 14, 15, 16, 17 |
| W/H == 16 | Modes 2, 3, 4, 5, 6, 7, 8, 9, 10, 11, 12, 13, 14, 15 |
| W/H == 8 | Modes 2, 3, 4, 5, 6, 7, 8, 9, 10, 11, 12, 13, 14, 15 |
| W/H == 4 | Modes 2, 3, 4, 5, 6, 7, 8, 9, 10, 11, 12, 13 |
| W/H == 2 | Modes 2, 3, 4, 5, 6, 7, 8, 9 |
| W/H == 1 | None |
| H/W == 1/2 | Modes 59, 60, 61, 62, 63, 64, 65, 66 |
| H/W == 1/4 | Modes 55, 56, 57, 58, 59, 60, 61, 62, 63, 64, 65, 66 |
| H/W == 1/8 | Modes 53, 54, 55, 56, 57, 58, 59, 60, 61, 62, 63, 64, 65, 66 |
| H/W == 1/16 | Modes 53, 54, 55, 56, 57, 58, 59, 60, 61, 62, 63, 64, 65, 66 |
| H/W == 1/32 | Modes 51, 52, 53, 54, 55, 56, 57, 58, 59, 60, 61, 62, 63, 64, 65, 66 |

Embodiments may include removing several conventional angles in a short side and adding a same number of wide angles in a long side. After removing the angles in the short side, remaining angles are all within diagonal angles of each block shape except N prediction angles. Example values of N include, but are not limited to, 1, 2, 3, and 4. After that, the N prediction angles are further adjusted to be within the diagonal angles.

Figure 7B:
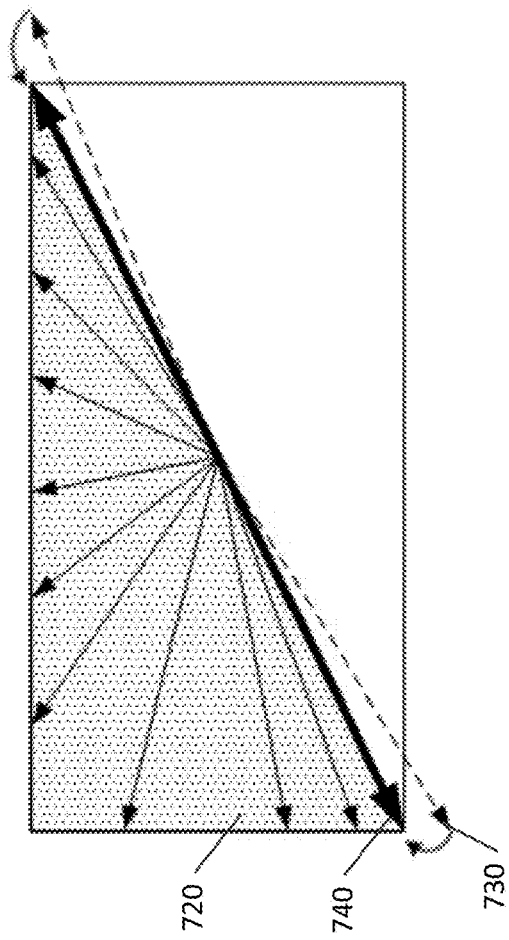
FIG. 7B is a diagram illustrating adjusting prediction angles beyond a diagonal direction, according to an embodiment.

FIG. 7B is a diagram illustrating adjusting prediction angles beyond a diagonal direction, according to an embodiment.

Referring to FIG. 7B, the prediction angles (730) (dotted arrows) beyond a diagonal direction are adjusted to be a prediction angle (740) (thick arrow) that is within the diagonal direction (within the top-left textured triangle area (720)).

In a case one or multiple prediction angles are adjusted, angles that are already within the diagonal direction are also further adjusted to equalize a distribution of all available prediction angles, e.g., the prediction angles become evenly distributed.

Instead of constraining prediction angles to be within a diagonal directions, as discussed above, embodiments may include constraining the prediction angles in a way that available prediction angles only utilize reference samples within a pre-defined range (or group or number) of reference samples.

In an embodiment, it is constrained that only top m*nWidth+1+offsetX (including a top-left corner) reference samples can be used for intra prediction, and that any intra prediction angles that may use reference samples outside the top n*nWidth+1+offsetX samples are disallowed. Example values of offsetX may include, but are not limited to, 1, 2, 3, 4, . . . , 14, . . . , and 48. Example values of m and n may include, but are not limited to, 1, 2, 3, and 4.

In an embodiment, it is constrained that only top m*nHeight+1+offsetY (including the top-left corner) reference samples can be used for intra prediction, and that any intra prediction angles that may use reference samples outside the top n*nHeight+1+offsetY samples are disallowed. Example values of offsetY may include, but are not limited to, 1, 2, 3, 4, . . . , 14, . . . , and 48. Example values of m and n may include, but are not limited to, 1, 2, 3, and 4.

In an embodiment, it is constrained that only m*max(nHeight, nWidth)+1+offset (including the top-left corner) reference samples can be used for intra prediction, and that any intra prediction angles that may use reference samples outside the n*max(nHeight, nWidth)+1+offset samples are disallowed. Example values of offset may include, but are not limited to, 1, 2, 3, 4, . . . , 14, . . . , and 48. Example values of m and n may include, but are not limited to 1, 2, 3, and 4.

In an embodiment, it is constrained that only m*min(nHeight, nWidth)+1+offset (including the top-left corner) reference samples can be used for intra prediction, and that any intra prediction angles that may use reference samples outside the n*min(nHeight, nWidth)+1+offset samples are disallowed. Example values of offset may include, but are not limited to, 1, 2, 3, 4, . . . , 14, . . . , and 48. Example values of m and n may include, but are not limited to, 1, 2, 3, and 4.

Embodiments may include removing 3, 5, 6, 7, or 8 modes in a short side when a width/height ratio is 2 (or 1/2), 4 (or 1/4), 8 (or 1/8), 16 (or 1/16), or 32 (1/32) in a case of 35 intra prediction modes, and removing 6, 10, 12, 14, or 16 modes in the short side when the width/height ratio is 2 (or 1/2), 4 (or 1/4), 8 (or 1/8), 16 (or 1/16), or 32 (1/32) in a case of 67 intra prediction modes.

In an embodiment, for remaining modes in the short side, if an angle of that mode is beyond a diagonal direction of that block, that angle will be mapped to the diagonal direction of that block. For example, in a case of 35 intra prediction modes, when width/height=2 (or 1/2), an angle of mode 5 (or 31) is 17/32, which is beyond a diagonal direction of that block, the angle of mode 5 (or 31) is mapped to 16/32; when width/height=4 (or 1/4), an angle of mode 7 (or 29) is 9/32, which is beyond a diagonal direction of that block, the angle of mode 7 (or 29) is mapped to 8/32; and when width/height=8 (or 1/8), an angle of mode 8 (or 28) is 5/32, which is beyond a diagonal direction of that block, the angle of mode 8 (or 28) is mapped to 4/32;

In another example, in a case of 67 intra prediction modes, when width/height=2 (or 1/2), an angle of mode 8 (or 60) is 17/32, which is beyond a diagonal direction of that block, the angle of mode 8 (or 60) is mapped to 16/32; when width/height=4 (or 1/4), an angle of mode 12 (or 56) is 9/32, which is beyond a diagonal direction of that block, the angle of mode 12 (or 56) is mapped to 8/32; when width/height=8 (or 1/8), an angle of mode 14 (or 54) is 5/32, which is beyond a diagonal direction of that block, the angle of mode 14 (or 54) is mapped to 4/32.

Embodiments may include modifying or setting angles of intra prediction modes so that angles contain a diagonal direction of all block shapes In an embodiment, it is proposed to include, into an angle table, angles α so that tan(α) is equal to {1/32, 2/32, 4/32, 8/32, 16/32, 32/32}. In another embodiment, it is proposed to increase a prediction angle accuracy from an 1/32 sample to an 1/64 sample, and include, into an angle table, angles α so that tan(α) is equal to {1/64, 2/64, 4/64, 8/64, 16/64, 32/64, 64/64}. In another embodiment, it is proposed to increase the prediction angle accuracy from an 1/32 sample to an 1/128 sample, and include, into an angle table, angles α so that tan(α) is equal to {1/128, 2/128, 4/128, 8/128, 16/128, 32/128, 64/128, 128/128}.

In another embodiment, in a case of 35 intra prediction modes, an angle table may be represented by Tables 5 and 6 below:

angles including diagonal intra prediction angles respectively corresponding to diagonal directions of all shapes of coding units.

Each of the diagonal intra prediction angles may be denoted by α, and tan(α) is equal to {1/32, 2/32, 4/32, 8/32, 16/32, 32/32}.

A number of the plurality of intra prediction modes included in the set table may be 67, and the set table may include Table 7 above Each of the diagonal intra prediction angles may be denoted by α, and tan(α) is equal to {1/64, 2/64, 4/64, 8/64, 16/64, 32/64, 64/64}.

Each of the diagonal intra prediction angles may be denoted by α, and tan(α) is equal to {1/128, 2/128, 4/128, 8/128, 16/128, 32/128, 64/128, 128/128}.

A number of the plurality of intra prediction modes included in the set table may be 35, and the set table may include Table 5 above.

TABLE 5

Specification of intraPredAngle

| predModeIntra | 1 | 2 | 3 | 1 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| intraPredAngle |  | 32 | 26 | 20 | 16 | 12 | 8 | 4 |  | 2 | 0 | −2 | −4 | −8 | −12 | −16 | −20 | −26 |
| predModeIntra | 18 | 19 | 20 | 21 | 22 | 23 | 24 | 25 |  | 26 | 27 | 28 | 29 | 30 | 31 | 32 | 33 | 34 |
| intraPredAngle | −32 | −26 | −20 | −16 | −12 | −8 | −4 | −2 |  | 0 | 2 | 4 | 8 | 12 | 16 | 20 | 26 | 32 |

TABLE 6

Specification of invAngle

| predModeIntra | 11 | 12 | 13 | 14 | 15 | 16 | 17 | 18 |
|---|---|---|---|---|---|---|---|---|
| invAngle | −4096 | −2048 | −1024 | −683 | −512 | −410 | −315 | −256 |
| predModeIntra | 19 | 20 | 21 | 22 | 23 | 24 | 25 | 26 |
| invAngle | −315 | −410 | −512 | −683 | −1024 | −2048 | −4096 | — |

In another embodiment, in a case of 67 intra prediction modes, an angle table may be represented by Table 7 below:

TABLE 7

Specification of intraPredAngle

| predModeIntra | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| intraPredAngle |  | 32 | 29 | 26 | 23 | 20 | 18 | 16 | 14 | 12 | 10 | 8 | 6 | 4 | 3 | 2 | 1 |
| predModeIntra | 18 | 19 | 20 | 21 | 22 | 23 | 24 | 25 | 26 | 27 | 28 | 29 | 30 | 31 | 32 | 33 | 34 |
| intraPredAngle | 0 | −1 | −2 | −3 | −4 | −6 | −8 | −10 | −12 | −14 | −16 | −18 | −20 | −23 | −26 | −29 | −32 |
| predModeIntra | 35 | 36 | 37 | 38 | 39 | 40 | 41 | 42 | 43 | 44 | 45 | 46 | 47 | 48 | 49 | 50 | 51 |
| intraPredAngle | −29 | −26 | −23 | −20 | −18 | −16 | −14 | −12 | −10 | −8 | −6 | −4 | −3 | −2 | −1 | 0 | 1 |
| predModeIntra | 52 | 53 | 54 | 55 | 56 | 57 | 58 | 59 | 60 | 61 | 62 | 63 | 64 | 65 | 66 |  |  |
| intraPredAngle | 2 | 3 | 4 | 6 | 8 | 10 | 12 | 14 | 16 | 18 | 20 | 23 | 26 | 29 | 32 |  |  |

In Tables 5-7 above, intraPredAngle denotes an intra prediction angle, predModeIntra denotes an intra prediction mode, and invAngle denotes an inverse angle.

Figure 8:
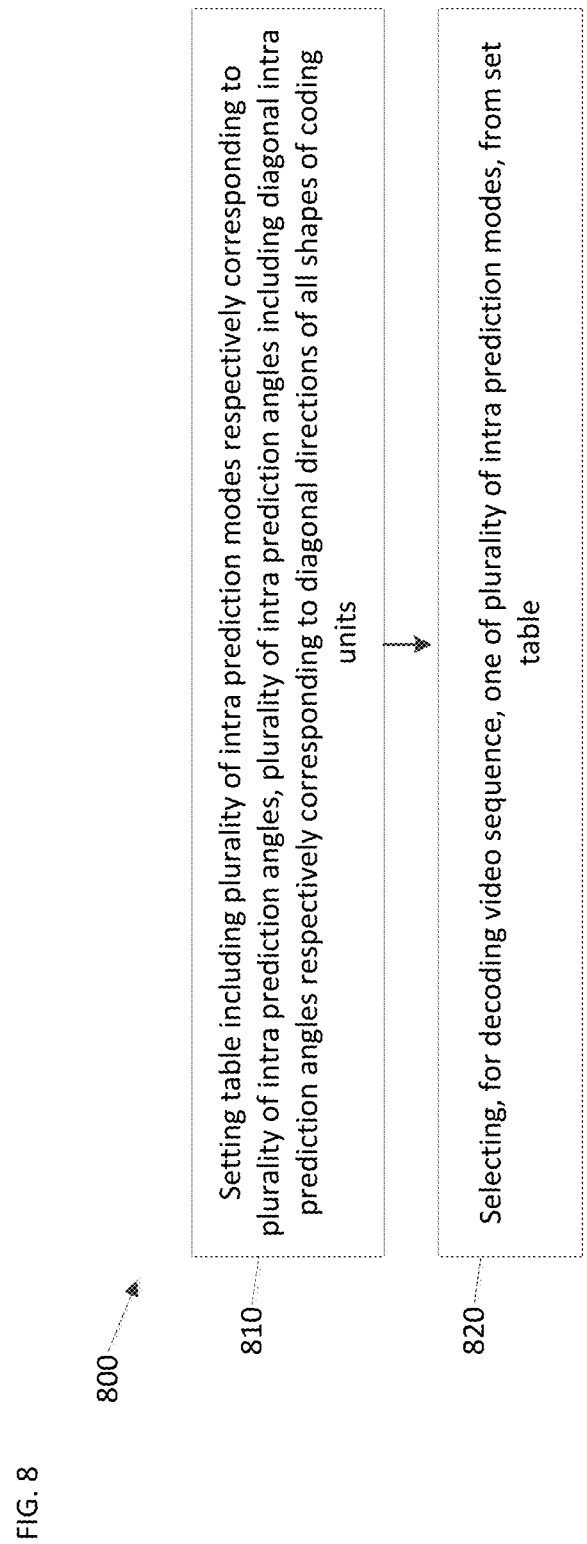
FIG. 8 is a flowchart illustrating a method of controlling intra prediction for decoding of a video sequence, according to an embodiment.

FIG. 8 is a flowchart illustrating a method (800) of controlling intra prediction for decoding of a video sequence, according to an embodiment. In some implementations, one or more process blocks of FIG. 8 may be performed by the decoder (310). In some implementations, one or more process blocks of FIG. 8 may be performed by another device or a group of devices separate from or including the decoder (310), such as the encoder (303).

Referring to FIG. 8, in a first block (810), the method (800) includes setting a table including a plurality of intra prediction modes respectively corresponding to a plurality of intra prediction angles, the plurality of intra prediction In a second block (820), the method (800) includes selecting, for decoding the video sequence, one of the plurality of intra prediction modes, from the set table.

The method (800) may further include determining a ratio of a width to a height of a coding unit, and based on the determined ratio being greater than or equal to 4 or less than or equal to 1/4, removing, from the set table, a first number of multiple intra prediction modes, the first number corresponding to the determined ratio and a shorter side among the width and the height. The selecting the one of the plurality of intra prediction modes may include selecting, for decoding the video sequence, the one of the plurality of intra prediction modes, from the table from which the first number of the multiple intra prediction modes is removed.

The removing the first number of multiple intra prediction modes may include, based on a second number of the plurality of intra prediction modes included in the table being 35, based on the determined ratio being 4, 8, 16 or 32, removing, from the set table, the first number of the multiple intra prediction modes, the first number being 5, 6, 7 or 8, respectively, and based on the determined ratio being 1/4, 1/8, 1/16 or 1/32, removing, from the set table, the first number of the multiple intra prediction modes, the first number being 5, 6, 7 or 8, respectively.

The removing the first number of multiple intra prediction modes may include, based on a second number of the plurality of intra prediction modes included in the table being 67, based on the determined ratio being 4, 8, 16 or 32, removing, from the set table, the first number of the multiple intra prediction modes, the first number being 10, 12, 14 or 16, respectively, and based on the determined ratio being 1/4, 1/8, 1/16 or 1/32, removing, from the set table, the first number of the multiple intra prediction modes, the first number being 10, 12, 14 or 16, respectively.

The method may further include, for each of the plurality of intra prediction modes included in the table from which the first number of the multiple intra prediction modes is removed, based on a respective one of the plurality of intra prediction angles being greater than a diagonal direction of the coding unit, mapping the respective one of the plurality of intra prediction angles to the diagonal direction.

Although FIG. 8 shows example blocks of the method (800), in some implementations, the method (800) may include additional blocks, fewer blocks, different blocks, or differently arranged blocks than those depicted in FIG. 8. Additionally, or alternatively, two or more of the blocks of the method (800) may be performed in parallel.

Further, the proposed methods may be implemented by processing circuitry (e.g., one or more processors or one or more integrated circuits). In an example, the one or more processors execute a program that is stored in a non-transitory computer-readable medium to perform one or more of the proposed methods.

Figure 9:
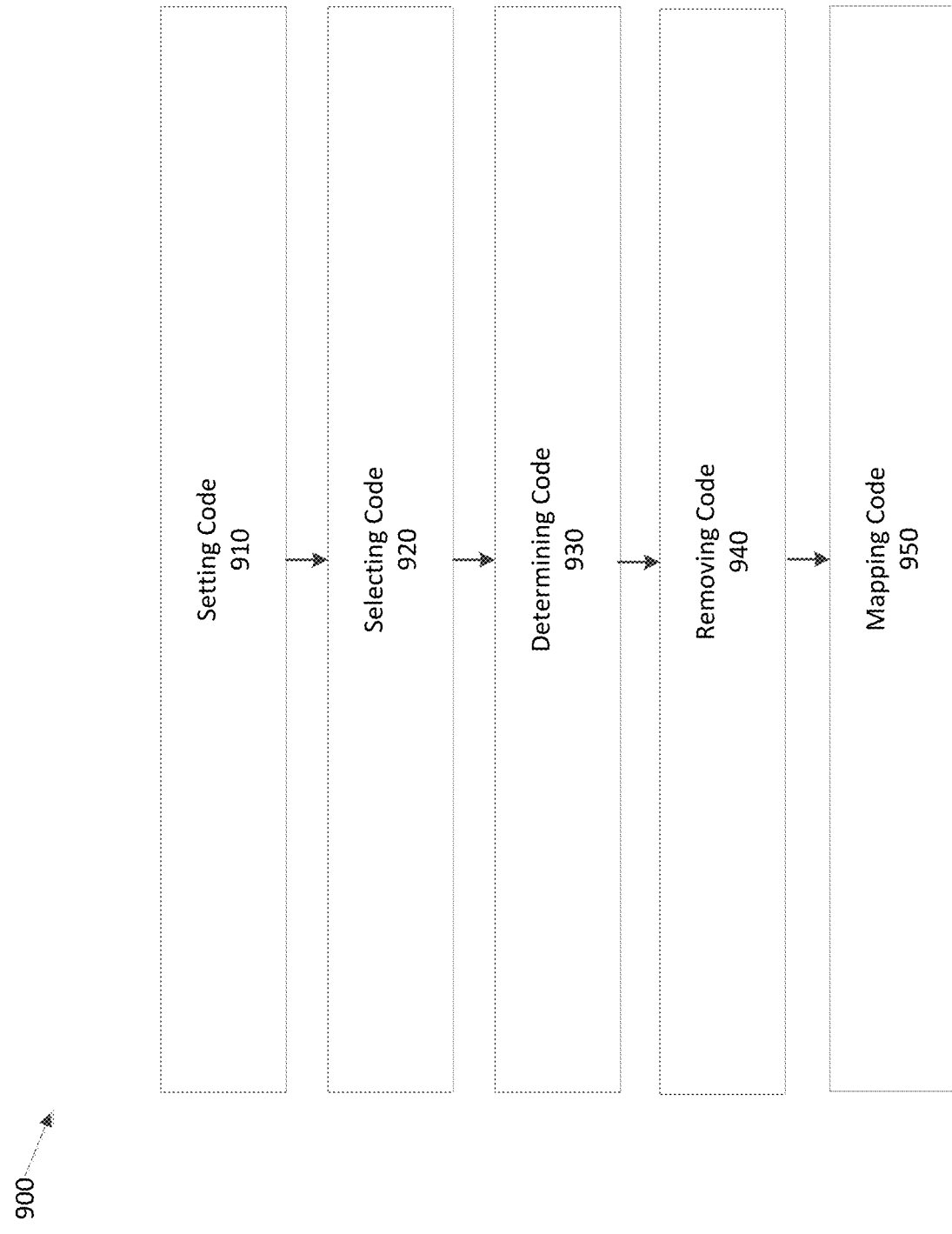
FIG. 9 is a simplified block diagram of an apparatus for controlling intra prediction for decoding of a video sequence, according to an embodiment.

FIG. 9 is a simplified block diagram of an apparatus (900) for controlling intra prediction for decoding of a video sequence, according to an embodiment.

Referring to FIG. 9, the apparatus (900) includes setting code (910) and selecting code (920).

The setting code (910) is configured to set a table including a plurality of intra prediction modes respectively corresponding to a plurality of intra prediction angles, the plurality of intra prediction angles including diagonal intra prediction angles respectively corresponding to diagonal directions of all shapes of coding units.

Each of the diagonal intra prediction angles may be denoted by $\alpha$, and $\tan(\alpha)$ is equal to $\{1/32, 2/32, 4/32, 8/32, 16/32, 32/32\}$.

A number of the plurality of intra prediction modes included in the set table may be 67, and the set table may include Table 7 above.

Each of the diagonal intra prediction angles may be denoted by $\alpha$, and $\tan(\alpha)$ is equal to $\{1/64, 2/64, 4/64, 8/64, 16/64, 32/64, 64/64\}$.

Each of the diagonal intra prediction angles may be denoted by $\alpha$, and $\tan(\alpha)$ is equal to $\{1/128, 2/128, 4/128, 8/128, 16/128, 32/128, 64/128, 128/128\}$.

A number of the plurality of intra prediction modes included in the set table may be 35, and the set table may include Table 5 above.

The selecting code (920) is configured to select, for decoding the video sequence, one of the plurality of intra prediction modes, from the set table.

The apparatus (900) may further include determining code (930) configured to determine a ratio of a width to a height of a coding unit, and removing code (940) configured to, based on the determined ratio being greater than or equal to 4 or less than or equal to 1/4, remove, from the set table, a first number of multiple intra prediction modes, the first number corresponding to the determined ratio and a shorter side among the width and the height. The selecting code (920) may be further configured to cause the at least one processor to select, for decoding the video sequence, the one of the plurality of intra prediction modes, from the table from which the first number of the multiple intra prediction modes is removed.

The removing code (930) may be further configured to, based on a second number of the plurality of intra prediction modes included in the table being 35, based on the determined ratio being 4, 8, 16 or 32, remove, from the set table, the first number of the multiple intra prediction modes, the first number being 5, 6, 7 or 8, respectively, and based on the determined ratio being 1/4, 1/8, 1/16 or 1/32, remove, from the set table, the first number of the multiple intra prediction modes, the first number being 5, 6, 7 or 8, respectively.

The removing code (930) may be further configured to, based on a second number of the plurality of intra prediction modes included in the table being 67, based on the determined ratio being 4, 8, 16 or 32, remove, from the set table, the first number of the multiple intra prediction modes, the first number being 10, 12, 14 or 16, respectively, and based on the determined ratio being 1/4, 1/8, 1/16 or 1/32, remove, from the set table, the first number of the multiple intra prediction modes, the first number being 10, 12, 14 or 16, respectively.

The apparatus (900) may further include mapping code (950) configured to, for each of the plurality of intra prediction modes included in the table from which the first number of the multiple intra prediction modes is removed, based on a respective one of the plurality of intra prediction angles being greater than a diagonal direction of the coding unit, map the respective one of the plurality of intra prediction angles to the diagonal direction.

The techniques described above, can be implemented as computer software using computer-readable instructions and physically stored in one or more computer-readable media.

FIG. 10 is a diagram of a computer system (1000) suitable for implementing embodiments.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 10 for computer system (1000) are exemplary in nature and are not intended to suggest any limitation as to the scope of use or functionality of the computer software implementing embodiments. Neither should the configuration of components be interpreted as having any dependency or requirement relating to any one or combination of components illustrated in the exemplary embodiment of a computer system (1000).

Computer system (1000) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1001), mouse (1002), trackpad (1003), touch screen (1010), data-glove (1004), joystick (1005), microphone (1006), scanner (1007), camera (1008).

Computer system (1000) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1010), data-glove (1004), or joystick (1005), but there can also be tactile feedback devices that do not serve as input devices), audio output devices (such as: speakers (1009), headphones (not depicted)), visual output devices (such as screens (1010) to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1000) can also include human accessible storage devices and their associated media such as optical media including CD/DVD ROM/RW (1020) with CD/DVD or the like media (1021), thumb-drive (1022), removable hard drive or solid state drive (1023), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1000) can also include interface(s) to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses ((1049)) (such as, for example universal serial bus (USB) ports of the computer system (1000); others are commonly integrated into the core of the computer system (1000) by attachment to a system bus as described below (for example Ethernet interface into a PC computer system or cellular network interface into a smartphone computer system). Using any of these networks, computer system (1000) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1040) of the computer system (1000).

The core (1040) can include one or more Central Processing Units (CPU) (1041), Graphics Processing Units (GPU) (1042), specialized programmable processing units in the form of Field Programmable Gate Areas (FPGA) (1043), hardware accelerators (1044) for certain tasks, and so forth. These devices, along with Read-only memory (ROM) (1045), Random-access memory (RAM) (1046), internal mass storage such as internal non-user accessible hard drives, solid-state drives (SSDs), and the like (1047), may be connected through a system bus (1048). In some computer systems, the system bus (1048) can be accessible in the form of one or more physical plugs to enable extensions by additional CPUs, GPU, and the like. The peripheral devices can be attached either directly to the core's system bus (1048), or through a peripheral bus (1049). Architectures for a peripheral bus include peripheral component interconnect (PCI), USB, and the like.

CPUs (1041), GPUs (1042), FPGAs (1043), and accelerators (1044) can execute certain instructions that, in combination, can make up the aforementioned computer code. That computer code can be stored in ROM (1045) or RAM (1046). Transitional data can also be stored in RAM (1046), whereas permanent data can be stored for example, in the internal mass storage (1047). Fast storage and retrieve to any of the memory devices can be enabled through the use of cache memory, that can be closely associated with one or more CPU (1041), GPU (1042), mass storage (1047), ROM (1045), RAM (1046), and the like.

The computer readable media can have computer code thereon for performing various computer-implemented operations. The media and computer code can be those specially designed and constructed for the purposes of embodiments, or they can be of the kind well known and available to those having skill in the computer software arts.

As an example and not by way of limitation, the computer system having architecture (1000), and specifically the core (1040) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1040) that are of non-transitory nature, such as core-internal mass storage (1047) or ROM (1045). The software implementing various embodiments can be stored in such devices and executed by core (1040). A computer-readable medium can include one or more memory devices or chips, according to particular needs. The software can cause the core (1040) and specifically the processors therein (including CPU, GPU, FPGA, and the like) to execute particular processes or particular parts of particular processes described herein, including defining data structures stored in RAM (1046) and modifying such data structures according to the processes defined by the software. In addition or as an alternative, the computer system can provide functionality as a result of logic hardwired or otherwise embodied in a circuit (for example: accelerator (1044)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. Embodiments encompass any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The invention claimed is:

1. A method of controlling intra prediction for encoding of a video sequence, the method being performed by at least one processor, and the method comprising:
   setting a table including a plurality of intra prediction modes respectively corresponding to a plurality of intra prediction angles; and
   selecting, for encoding the video sequence, one of the plurality of intra prediction modes, from the set table,
   wherein a number of the plurality of intra prediction modes included in the set table is 67, the set table including:

| predModeIntra | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| intraPredAngle | — | 32 | 29 | 26 | 23 | 20 | 18 | 16 | 14 | 12 | 10 | 8 | 6 | 4 | 3 | 2 | 1 |
| predModeIntra | 18 | 19 | 20 | 21 | 22 | 23 | 24 | 25 | 26 | 27 | 28 | 29 | 30 | 31 | 32 | 33 | 34 |
| intraPredAngle | 0 | −1 | −2 | −3 | −4 | −6 | −8 | −10 | −12 | −14 | −16 | −18 | −20 | −23 | −26 | −29 | −32 |
| predModeIntra | 35 | 36 | 37 | 38 | 39 | 40 | 41 | 42 | 43 | 44 | 45 | 46 | 47 | 48 | 49 | 50 | 51 |
| intraPredAngle | −29 | −26 | −23 | −20 | −18 | −16 | −14 | −12 | −10 | −8 | −6 | −4 | −3 | −2 | −1 | 0 | 1 |
| predModeIntra | 52 | 53 | 54 | 55 | 56 | 57 | 58 | 59 | 60 | 61 | 62 | 63 | 64 | 65 | 66 | | |
| intraPredAngle | 2 | 3 | 4 | 6 | 8 | 10 | 12 | 14 | 16 | 18 | 20 | 23 | 26 | 29 | 32 | | | where predModeIntra comprises the plurality of intra prediction modes and intraPredAngle comprises the plurality of intra prediction angles.

2. The method of claim 1, wherein each of the diagonal intra prediction angles is denoted by $\alpha$, and $\tan(\alpha)$ is equal to {1/32, 2/32, 4/32, 8/32, 16/32, 32/32}.

3. The method of claim 1, wherein a number of a subset of intra prediction modes included in the set table is 35, and the set table corresponding to the subset includes:

| predModeIntra | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| intraPredAngle | — | 32 | 26 | 20 | 16 | 12 | 8 | 4 | 2 | 0 | −2 | −4 | −8 | −12 | −16 | −20 | −26 |
| predModeIntra | 18 | 19 | 20 | 21 | 22 | 23 | 24 | 25 | 26 | 27 | 28 | 29 | 30 | 31 | 32 | 33 | 34 |
| intraPredAngle | −32 | −26 | −20 | −16 | −12 | −8 | −4 | −2 | 0 | 2 | 4 | 8 | 12 | 16 | 20 | 26 | 32 | where predModeIntra comprises the plurality of intra prediction modes, and intraPredAngle comprises the plurality of intra prediction angles.

4. The method of claim 1, further comprising:
   determining a ratio of a width to a height of a coding unit; and
   based on the determined ratio being greater than or equal to 4 or less than or equal to 1/4, removing, from the set table, a first number of multiple intra prediction modes such that the set table after the removing the first number of multiple intra prediction modes corresponds to the subset of intra prediction modes,
   wherein the first number corresponds to the determined ratio and a shorter side among the width and the height, and
   wherein the selecting the one of the plurality of intra prediction modes comprises selecting, for encoding the video sequence, the one of the plurality of intra prediction modes, from the set table after the removing.

5. The method of claim 4, wherein the removing the first number of multiple intra prediction modes comprises, based on a second number of the plurality of intra prediction modes included in the set table being 35:
   based on the determined ratio being 4, 8, 16 or 32, removing, from the set table, the first number of the multiple intra prediction modes, the first number being 5, 6, 7 or 8, respectively; and
   based on the determined ratio being 1/4, 1/8, 1/16 or 1/32, removing, from the set table, the first number of the multiple intra prediction modes, the first number being 5, 6, 7 or 8, respectively.

6. The method of claim 4, wherein the removing the first number of multiple intra prediction modes comprises, based on a second number of the plurality of intra prediction modes included in the set table being 67:
   based on the determined ratio being 4, 8, 16 or 32, removing, from the set table, the first number of the multiple intra prediction modes, the first number being 10, 12, 14 or 16, respectively; and
   based on the determined ratio being 1/4, 1/8, 1/16 or 1/32, removing, from the set table, the first number of the multiple intra prediction modes, the first number being 10, 12, 14 or 16, respectively.

7. The method of claim 4, further comprising, for each of the plurality of intra prediction modes included in the set table from which the first number of the multiple intra prediction modes is removed, based on a respective one of the plurality of intra prediction angles being greater than a diagonal direction of the coding unit, mapping the respective one of the plurality of intra prediction angles to the diagonal direction.

8. An apparatus for controlling intra prediction for encoding of a video sequence, the apparatus comprising:
   at least one memory configured to store computer program code; and
   at least one processor configured to access the at least one memory and operate according to the computer program code, the computer program code comprising:
      setting code configured to cause the at least one processor to set a table including a plurality of intra prediction modes respectively corresponding to a plurality of intra prediction angles; and
      selecting code configured to cause the at least one processor to select, for encoding the video sequence, one of the plurality of intra prediction modes, from the set table,
      wherein a number of the plurality of intra prediction modes included in the set table is 67, the set table including:

| predModeIntra | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| intraPredAngle | — | 32 | 29 | 26 | 23 | 20 | 18 | 16 | 14 | 12 | 10 | 8 | 6 | 4 | 3 | 2 | 1 |
| predModeIntra | 18 | 19 | 20 | 21 | 22 | 23 | 24 | 25 | 26 | 27 | 28 | 29 | 30 | 31 | 32 | 33 | 34 |
| intraPredAngle | 0 | −1 | −2 | −3 | −4 | −6 | −8 | −10 | −12 | −14 | −16 | −18 | −20 | −23 | −26 | −29 | −32 |
| predModeIntra | 35 | 36 | 37 | 38 | 39 | 40 | 41 | 42 | 43 | 44 | 45 | 46 | 47 | 48 | 49 | 50 | 51 |
| intraPredAngle | −29 | −26 | −23 | −20 | −18 | −16 | −14 | −12 | −10 | −8 | −6 | −4 | −3 | −2 | −1 | 0 | 1 |
| predModeIntra | 52 | 53 | 54 | 55 | 56 | 57 | 58 | 59 | 60 | 61 | 62 | 63 | 64 | 65 | 66 | | |
| intraPredAngle | 2 | 3 | 4 | 6 | 8 | 10 | 12 | 14 | 16 | 18 | 20 | 23 | 26 | 29 | 32 | | | where predModeIntra comprises the plurality of intra prediction modes, and intraPredAngle comprises the plurality of intra prediction angles.

9. The apparatus of claim 8, wherein each of the diagonal intra prediction angles is denoted by α, and tan(α) is equal to {1/32, 2/32, 4/32, 8/32, 16/32, 32/32}.

10. The apparatus of claim 8, wherein a number of a subset of intra prediction modes included in the set table is 35, and
the set table corresponding to the subset includes:

| predModeIntra | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| intraPredAngle | — | 32 | 26 | 20 | 16 | 12 | 8 | 4 | 2 | 0 | −2 | −4 | −8 | −12 | −16 | −20 | −26 |
| predModeIntra | 18 | 19 | 20 | 21 | 22 | 23 | 24 | 25 | 26 | 27 | 28 | 29 | 30 | 31 | 32 | 33 | 34 |
| intraPredAngle | −32 | −26 | −20 | −16 | −12 | −8 | −4 | −2 | 0 | 2 | 4 | 8 | 12 | 16 | 20 | 26 | 32 | where predModeIntra comprises the plurality of intra prediction modes, and intraPredAngle comprises the plurality of intra prediction angles.

11. The apparatus of claim 8, wherein the computer program code further comprises:
determining code configured to cause the at least one processor to determine a ratio of a width to a height of a coding unit; and
removing code configured to cause the at least one processor to, based on the determined ratio being greater than or equal to 4 or less than or equal to 1/4, remove, from the set table, a first number of multiple intra prediction modes such that the set table after the removing the first number of multiple intra prediction modes corresponds to the subset of intra prediction modes,
wherein the first number corresponding to the determined ratio and a shorter side among the width and the height, and
wherein the selecting code is further configured to cause the at least one processor to select, for encoding the video sequence, the one of the plurality of intra prediction modes, from the set table after the removing.

12. The apparatus of claim 11, wherein the removing code is further configured to cause the at least one processor to, based on a second number of the plurality of intra prediction modes included in the set table being 35:
based on the determined ratio being 4, 8, 16 or 32, remove, from the set table, the first number of the multiple intra prediction modes, the first number being 5, 6, 7 or 8, respectively; and
based on the determined ratio being 1/4, 1/8, 1/16 or 1/32, remove, from the set table, the first number of the multiple intra prediction modes, the first number being 5, 6, 7 or 8, respectively.

13. The apparatus of claim 11, wherein the removing code is further configured to cause the at least one processor to, based on a second number of the plurality of intra prediction modes included in the set table being 67:
based on the determined ratio being 4, 8, 16 or 32, remove, from the set table, the first number of the multiple intra prediction modes, the first number being 10, 12, 14 or 16, respectively; and
based on the determined ratio being 1/4, 1/8, 1/16 or 1/32, remove, from the set table, the first number of the multiple intra prediction modes, the first number being 10, 12, 14 or 16, respectively.

14. A non-transitory computer-readable storage medium storing instructions that cause a processor to:
set a table including a plurality of intra prediction modes respectively corresponding to a plurality of intra prediction angles; and
select, for encoding a video sequence, one of the plurality of intra prediction modes, from the set table,
wherein a number of the plurality of intra prediction modes included in the set table is 67, the set table including:

| predModeIntra | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| intraPredAngle | — | 32 | 29 | 26 | 23 | 20 | 18 | 16 | 14 | 12 | 10 | 8 | 6 | 4 | 3 | 2 | 1 |
| predModeIntra | 18 | 19 | 20 | 21 | 22 | 23 | 24 | 25 | 26 | 27 | 28 | 29 | 30 | 31 | 32 | 33 | 34 |
| intraPredAngle | 0 | −1 | −2 | −3 | −4 | −6 | −8 | −10 | −12 | −14 | −16 | −18 | −20 | −23 | −26 | −29 | −32 |
| predModeIntra | 35 | 36 | 37 | 38 | 39 | 40 | 41 | 42 | 43 | 44 | 45 | 46 | 47 | 48 | 49 | 50 | 51 |
| intraPredAngle | −29 | −26 | −23 | −20 | −18 | −16 | −14 | −12 | −10 | −8 | −6 | −4 | −3 | −2 | −1 | 0 | 1 |
| predModeIntra | 52 | 53 | 54 | 55 | 56 | 57 | 58 | 59 | 60 | 61 | 62 | 63 | 64 | 65 | 66 | | |
| intraPredAngle | 2 | 3 | 4 | 6 | 8 | 10 | 12 | 14 | 16 | 18 | 20 | 23 | 26 | 29 | 32 | | | where predModeIntra comprises the plurality of intra prediction modes, and intraPredAngle comprises the plurality of intra prediction angles.

* * * * *